US012637397B2

(12) United States Patent  (10) Patent No.: US 12,637,397 B2
Goris et al.  (45) Date of Patent: May 26, 2026

(54) METHODS FOR PRODUCING HIGHER ALCOHOLS FROM WASTE PLASTIC PYROLYSIS OIL AND THE HIGHER ALCOHOLS OBTAINED THEREFROM

(71) Applicant: ExxonMobil Chemical Patents Inc., Baytown, TX (US)

(72) Inventors: Hans K. T. Goris, Zaventem (BE); Chunzhao Li, Webster, TX (US); Daniel Bien, Rheinland Pfalz (DE); Alex E. Carpenter, Austin, TX (US); Cody M. Diaz, Raritan, NJ (US)

(73) Assignee: ExxonMobil Chemical Patents Inc., Spring, TX (US)

( * ) Notice: Subject to any disclaimer, the term of this patent is extended or adjusted under 35 U.S.C. 154(b) by 402 days.

(21) Appl. No.: 18/245,956

(22) PCT Filed: Oct. 18, 2021

(86) PCT No.: PCT/EP2021/078784
§ 371 (c)(1),
(2) Date: Mar. 20, 2023

(87) PCT Pub. No.: WO2022/084238
PCT Pub. Date: Apr. 28, 2022

(65) Prior Publication Data
US 2023/0382818 A1      Nov. 30, 2023

Related U.S. Application Data

(60) Provisional application No. 63/104,894, filed on Oct. 23, 2020.

(30) Foreign Application Priority Data

Dec. 16, 2020   (EP) ..................................... 20214454

(51) Int. Cl.
*C07B 41/02*      (2006.01)
*B01D 3/14*       (2006.01)

(52) U.S. Cl.
CPC ................ *C07B 41/02* (2013.01); *B01D 3/14* (2013.01)

(58) Field of Classification Search
CPC ......... C07C 41/02; C07C 29/14; C07C 29/16; C07C 45/85; C07C 45/50; C07C 31/125
See application file for complete search history.

(56) References Cited

U.S. PATENT DOCUMENTS

| 3,696,160 A | 10/1972 | Chomyn |
| 6,118,034 A | 9/2000 | Vicari et al. |

(Continued)

FOREIGN PATENT DOCUMENTS

| EP | 0183545 A1 | 6/1986 |
| EP | 1004563 B1 | 4/2004 |

(Continued)

OTHER PUBLICATIONS

Extended European Search Report received for European Patent Application No. 20214454.9 mailing date Jun. 11, 2021, 8 Pages.

(Continued)

*Primary Examiner* — Jafar F Parsa

(57) ABSTRACT

A method for producing a higher alcohol from a waste plastic feedstock is disclosed, comprising: (a) providing a hydrocarbon feed stream comprising a pyrolysis oil feed obtained from pyrolysis of plastic waste, wherein the pyrolysis oil comprises at least 20 wt % higher olefins with a carbon number in the range C5-C20, based on its total hydrocarbon content; (b) contacting the hydrocarbon feed stream with synthesis gas under hydroformylation conditions in the presence of a hydroformylation catalyst and recovering a hydroformylation product; (c) subjecting the (Continued)

hydroformylation product to hydrogenation and/or a distillation to recover a higher alcohol product.

9 Claims, 13 Drawing Sheets

(56) References Cited

U.S. PATENT DOCUMENTS

| | | | |
|---|---|---|---|
| 6,469,223 B2 | 10/2002 | Kelly et al. | |
| 10,308,896 B2 | 6/2019 | Scheibel et al. | |
| 2022/0098490 A1* | 3/2022 | Abbott | C10G 9/00 |

FOREIGN PATENT DOCUMENTS

| | | | |
|---|---|---|---|
| EP | 2338864 A1 | 6/2011 | |
| JP | 2002-088375 A | 3/2002 | |
| WO | 93/13040 A1 | 7/1993 | |
| WO | 2011/123145 A1 | 10/2011 | |
| WO | 2013/070801 A1 | 5/2013 | |
| WO | 2014/128430 A1 | 8/2014 | |
| WO | 2017/080690 A1 | 5/2017 | |
| WO | 2022/084238 A1 | 4/2022 | |

OTHER PUBLICATIONS

International Preliminary Report on Patentability received for PCT Application No. PCT/EP2021/078784, mailing date May 4, 2023, 8 Pages.

International Search Report and Written Opinion received for PCT Application No. PCT/EP2021/078784, mailing date Jan. 4, 2022, 11 Pages.

Sharuddin, S. D. et al., (2016) "A review on pyrolysis of plastic wastes", Energy conversion and management, vol. 115, pp. 308-326.

Fulmer, Gregory R. (2010) "NMR Chemical Shifts of Trace Impurities: Common Laboratory solvents, Organics, and Gases in Deuterated Solvents Relevant to the Organometallic Chemist", Organometallics, 29, p. 2176-2179.

* cited by examiner

METHODS FOR PRODUCING HIGHER ALCOHOLS FROM WASTE PLASTIC PYROLYSIS OIL AND THE HIGHER ALCOHOLS OBTAINED THEREFROM

FIELD

The present disclosure relates to methods for producing higher alcohols from waste plastic pyrolysis oil and to the higher alcohols obtained therefrom.

BACKGROUND

The current environmental awareness, in particular the concerns over fossil fuel extraction and the increasing global problem of plastic waste are driving the chemical industry to look for more sustainable feeds and products. In line with these efforts, pyrolysis oil obtained by pyrolysis of waste plastic can represent a viable alternative or a valuable addition to the conventional fossil fuel based feedstocks. An advantage of pyrolysis is that it can be used with mixed plastic waste, whereas conventional mechanical plastic recycling processes requires extensive sorting and cleaning.

Although the liquid plastic pyrolysis products (pyrolysis oil) has desirable properties that recommends it as a feed for producing fuels, and C2=, C3= monomer for olefin based polymers, it is seldom in a form ready to be used as a feedstock for higher alcohols. Often the pyrolysis oil has limited olefin content and/or contains high level of contaminants such as chlorides or metals.

U.S. Pat. No. 10,308,896 describes a rather cumbersome method for producing oxo alcohols from waste plastic feedstock, which includes pre-fractionating the feed stream comprising the waste plastic feedstock to produce a first heart cut paraffin stream, hydrotreating the first heart cut paraffin stream and fractionating to obtain a second heart cut paraffin stream, followed by dehydrogenating of the second heart cut paraffin stream to form a stream comprising olefins, which is finally hydroformylated to prepare oxo alcohols.

Accordingly, there is a need to provide improved methods for producing higher alcohols from pyrolysis oil obtained from the pyrolysis of waste plastic, wherein the pyrolysis oil can be used as the solely feed or in combination with conventional feedstocks.

SUMMARY

In a first aspect, the present disclosure provides a method for producing a higher alcohol from a waste plastic feedstock, comprising: (a) providing a hydrocarbon feed stream comprising a pyrolysis oil feed obtained from pyrolysis of plastic waste, wherein the pyrolysis oil comprises at least 20 wt % higher olefins with a carbon number in the range C5-C20, based on its total hydrocarbon content; (b) contacting the hydrocarbon feed stream with synthesis gas under hydroformylation conditions in the presence of a hydroformylation catalyst and recovering a hydroformylation product; (c) subjecting the hydroformylation product to hydrogenation and/or a distillation to recover a higher alcohol product.

In embodiments of the disclosure the hydrocarbon feed stream may consist essentially of pyrolysis oil obtained from pyrolysis of plastic waste.

In other embodiments of the disclosure, the hydrocarbon feed stream may further comprise a higher olefins conventional feed, wherein the higher olefins conventional feed can be a petroleum-based higher olefins feed, such as a higher olefins feed obtained by oligomerization of C3=, C4=, C5= olefins.

In embodiments of the disclosure the pyrolysis oil feed may comprise at least 50 wt % linear alpha-olefins, more preferably at least 60 wt % linear alpha-olefins, based on its total olefin content. In such embodiments, the pyrolysis oil feed may be characterized by an average number of branches per molecule (also referred in the art as branching index) that is less than 1, preferably less than or equal to 0.8.

In embodiments of the disclosure the method may further comprise prior to step (b), subjecting the pyrolysis oil feed to a distillation thereby separating one or more fractions corresponding to any narrow cut range within the range C7-C20, in particular to the carbon number ranges C7-C19, C7-C10, C7-C12, C10-C13, C13-C17, C13-C15 and C16-C19.

Additionally or alternatively, the method may further comprise prior to step (b) one or more of: subjecting at least a portion of the hydrocarbon feed stream, preferably the pyrolysis oil feed, to a selective reduction of diolefins in the presence of a nickel-containing catalyst; contacting at least a portion of the hydrocarbon feed stream, preferably the pyrolysis oil feed, with a water solution to thereby at least partially remove water-soluble contaminants; contacting at least a portion of the hydrocarbon feed stream, preferably the pyrolysis oil feed, with one or more adsorbents suitable to thereby at least partially remove one or more contaminants selected from: water, metals, chlorides, nitrogen-containing compounds, oxygenates, and phosphorous-containing compounds. In particular embodiments, the steps of contacting the at least a portion of the hydrocarbon feed stream, preferably the pyrolysis oil feed, with a water solution and/or with one or more adsorbents are performed prior to the selective reduction of diolefins.

In a further aspect, the present disclosure provides a higher alcohol obtainable by the method of the disclosure and compositions comprising one or more derivatives of such higher alcohol.

The derivative may comprise esters of monocarboxylic acids, dicarboxylic acids, esters of polycarboxylic acids, alkoxylated alcohols, sulfated alcohols, sulfated alkoxylated alcohols and alcohol ether amines.

Alternatively, the derivative may comprise esters of the primary alcohol composition with one or more acids. Further, the acids may comprise one or more of phthalic acid, adipic acid, sebacic acid, lauric acid, myristic acid, palmitic acid, stearic acid, oleic acid, succinic acid and trimellitic acid.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one having ordinary skill in the art and having the benefit of this disclosure.

DETAILED DESCRIPTION

Figure 1:
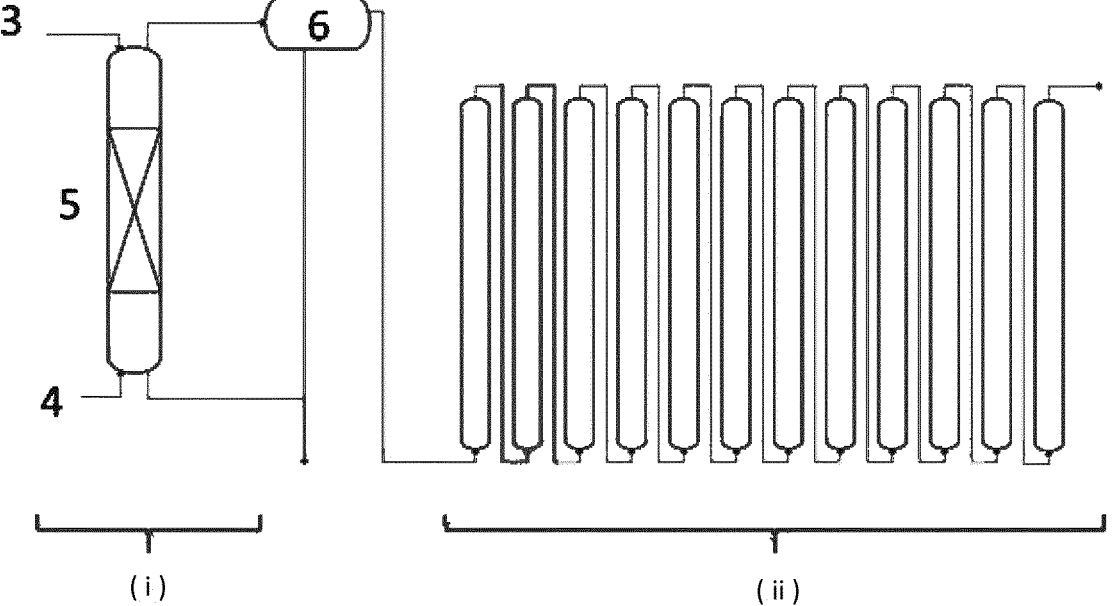
FIG. 1: Overall flow scheme for contaminants removal form waste plastic pyrolysis oil feed according to the invention.
Figure 2:
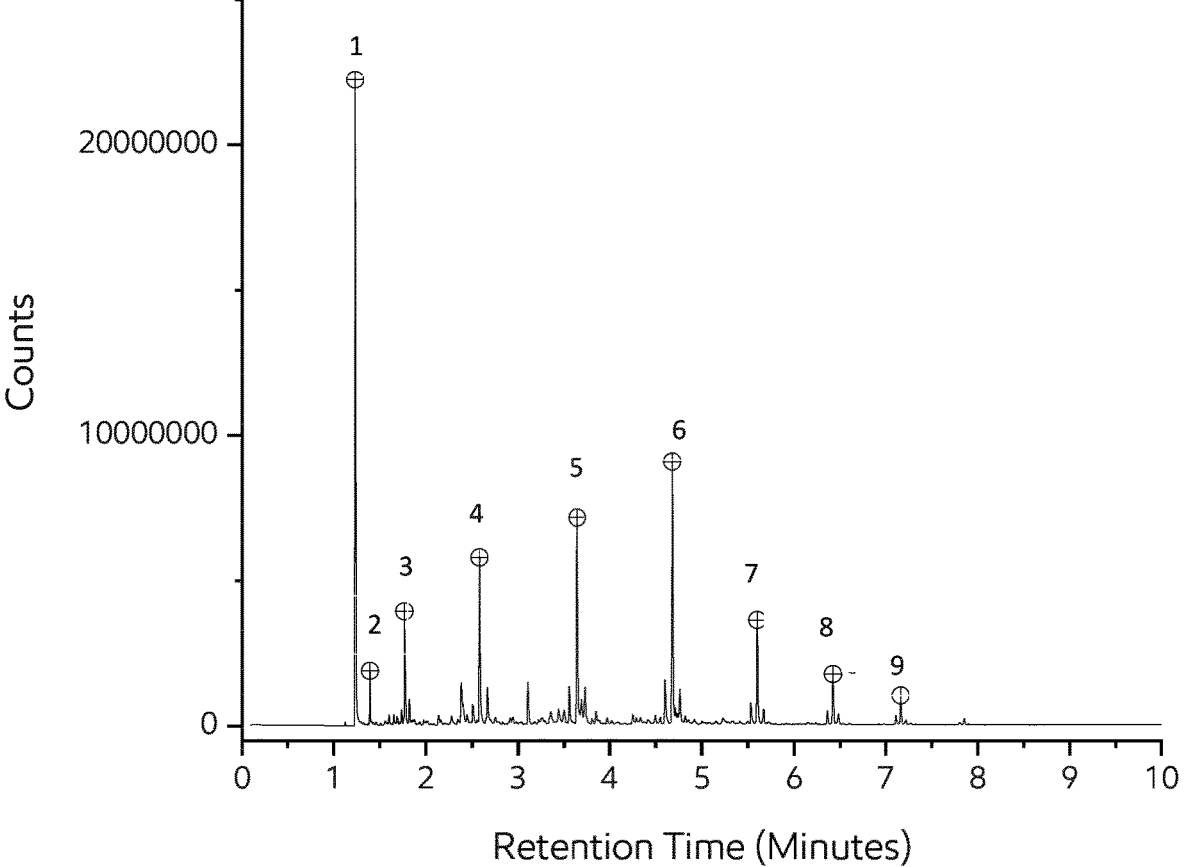
FIG. 2: Labelled GC-MS trace of low-boiling pyrolysis oil feed fraction according to the invention.
Figure 3:
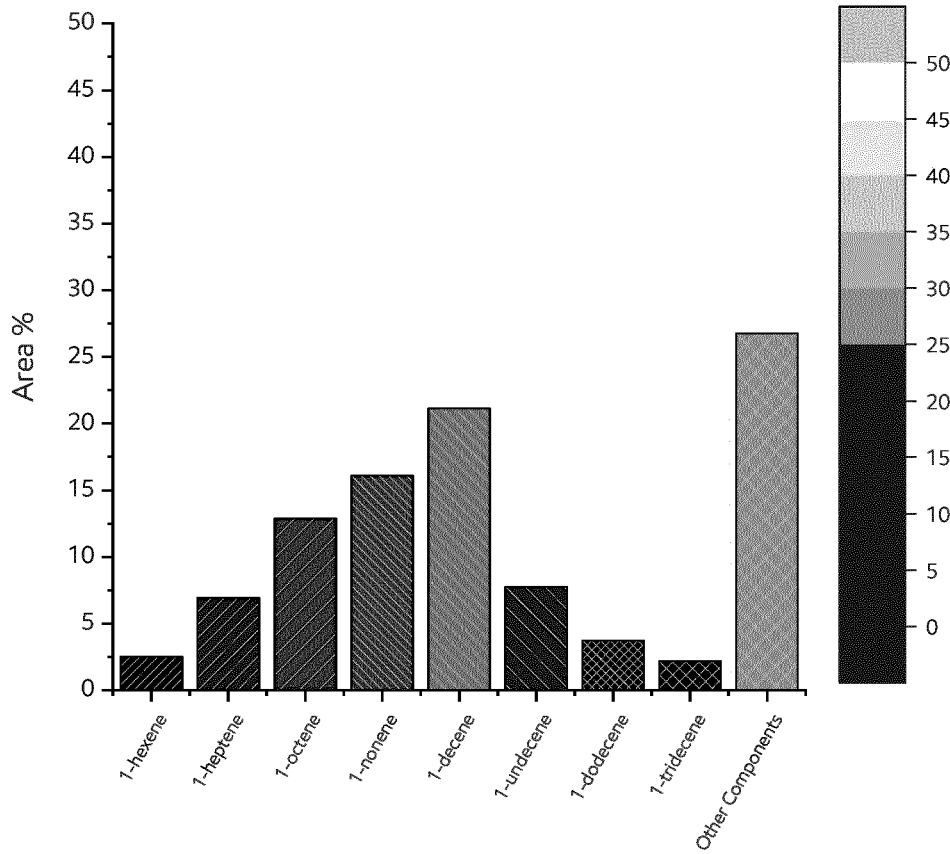
FIG. 3: Area percentage bar chart for low-boiling pyrolysis oil feed fraction according to the invention.
Figure 4:
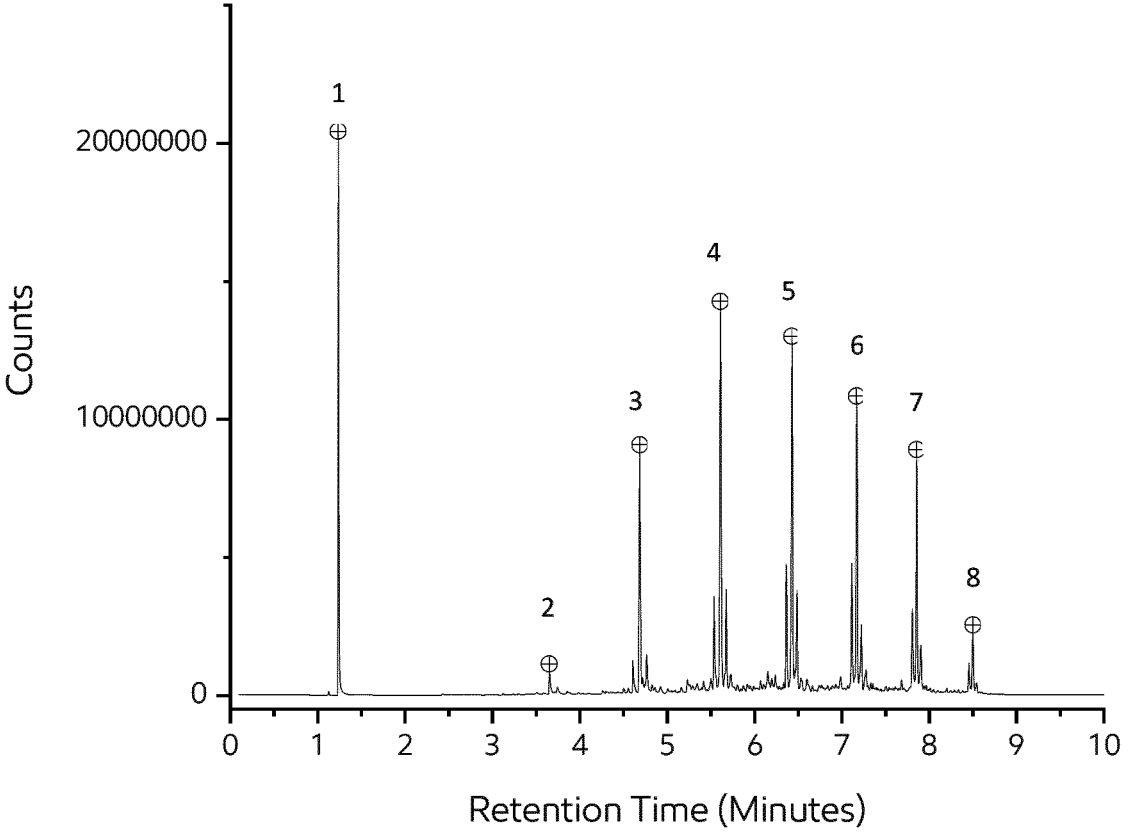
FIG. 4: Labelled GC-MS trace of high-boiling pyrolysis oil feed according to the invention.
Figure 5:
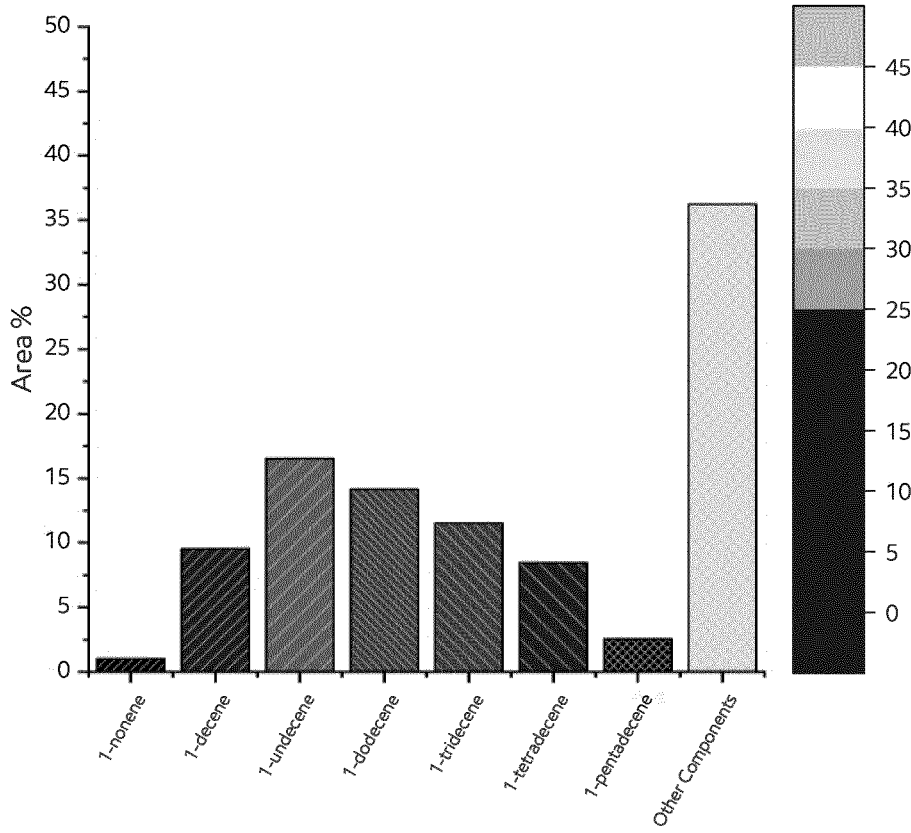
FIG. 5: Area percentage bar chart for high-boiling pyrolysis oil feed fraction according to the invention.
Figure 6:
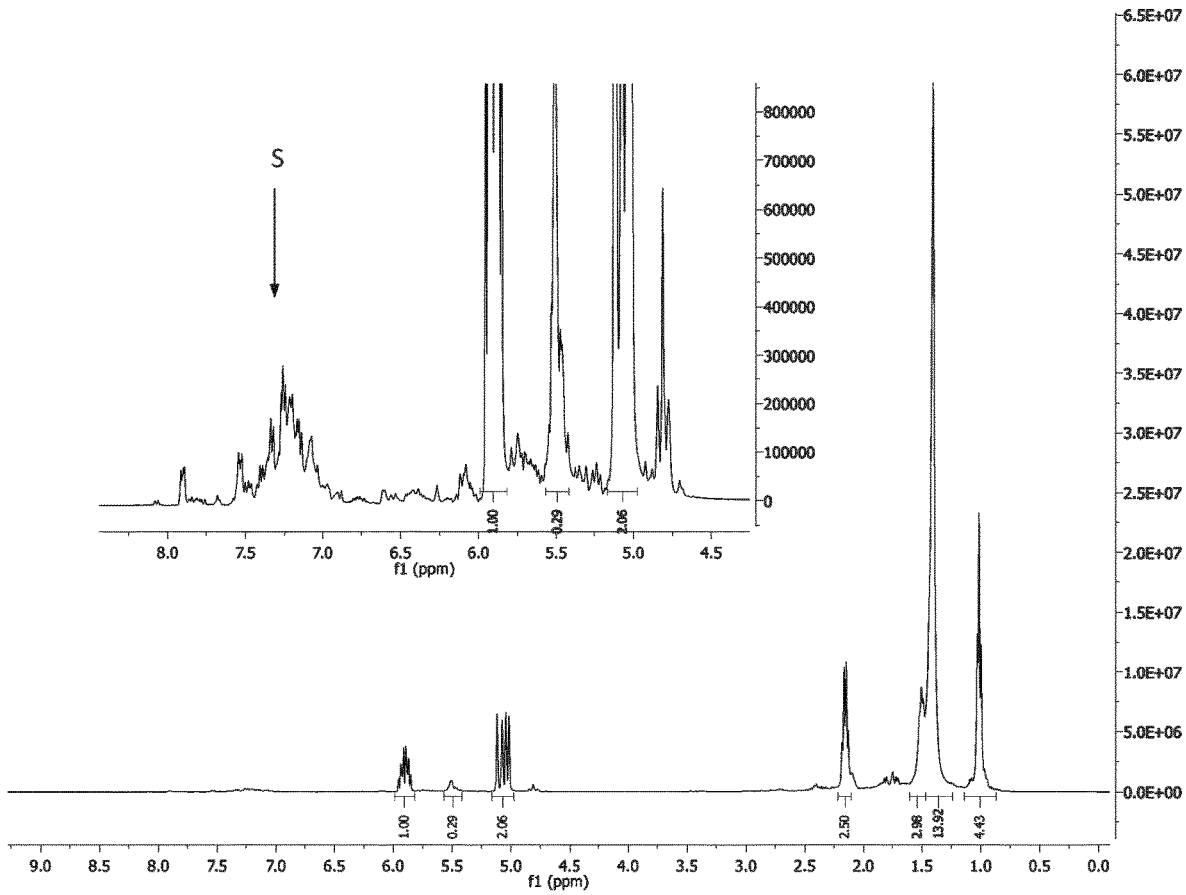
FIG. 6: $^1$H NMR spectrum of low-boiling pyrolysis oil feed fraction according to the invention. The insert shows the 4.5 to 8.0 ppm range; CDCl3 was used as solvent indicated with (S) on the spectrum.
Figure 7:
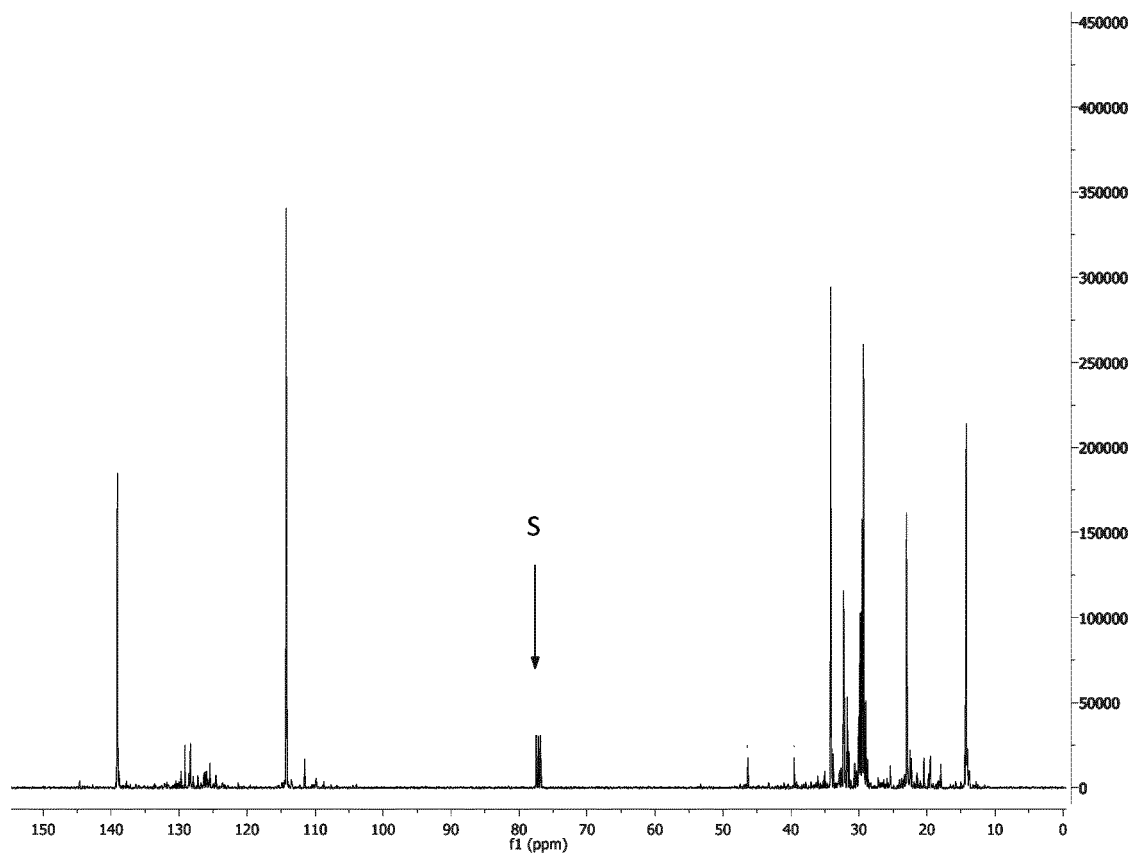
FIG. 7: $^{13}$C{1H} NMR spectrum of low-boiling pyrolysis oil feed fraction according to the invention. CDCl3 was used as solvent indicated with (S) on the spectrum.
Figure 8:
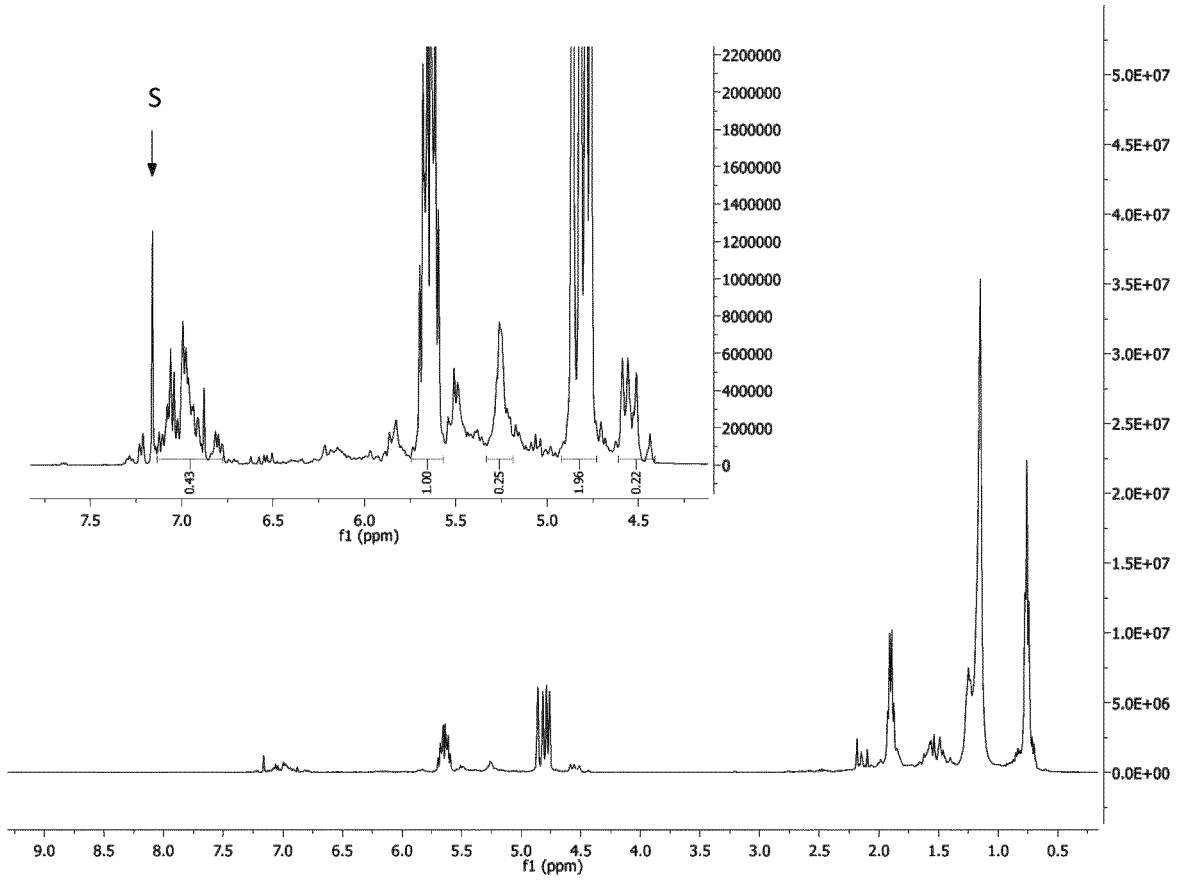
FIG. 8: $^1$H NMR spectrum of high-boiling pyrolysis oil feed fraction according to the invention. The insert shows the 4.5 to 7.5 ppm range; CDCl3 was used as solvent indicated with (S) on the spectrum.
Figure 9:
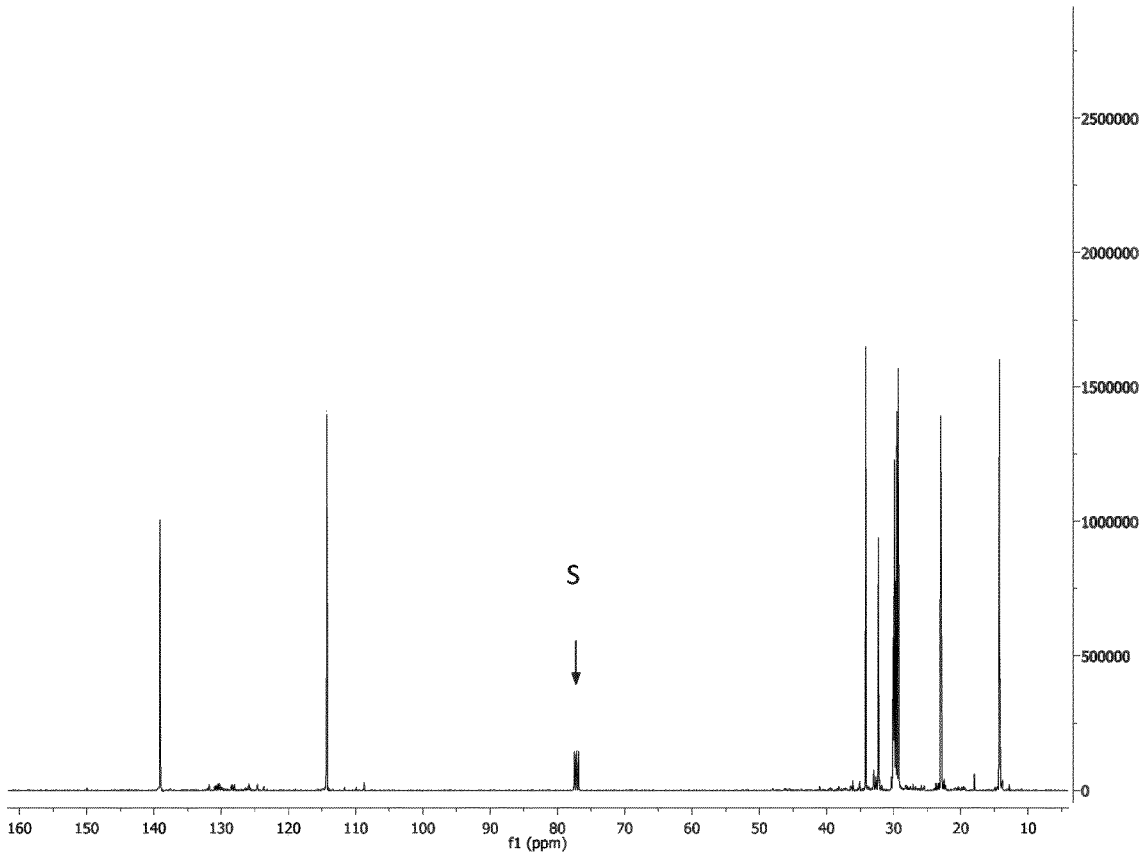
FIG. 9: $^{13}$C{1H} NMR spectrum of high-boiling pyrolysis oil feed fraction according to the invention. CDCl3 was used as solvent indicated with (S) on the spectrum.
Figure 10:
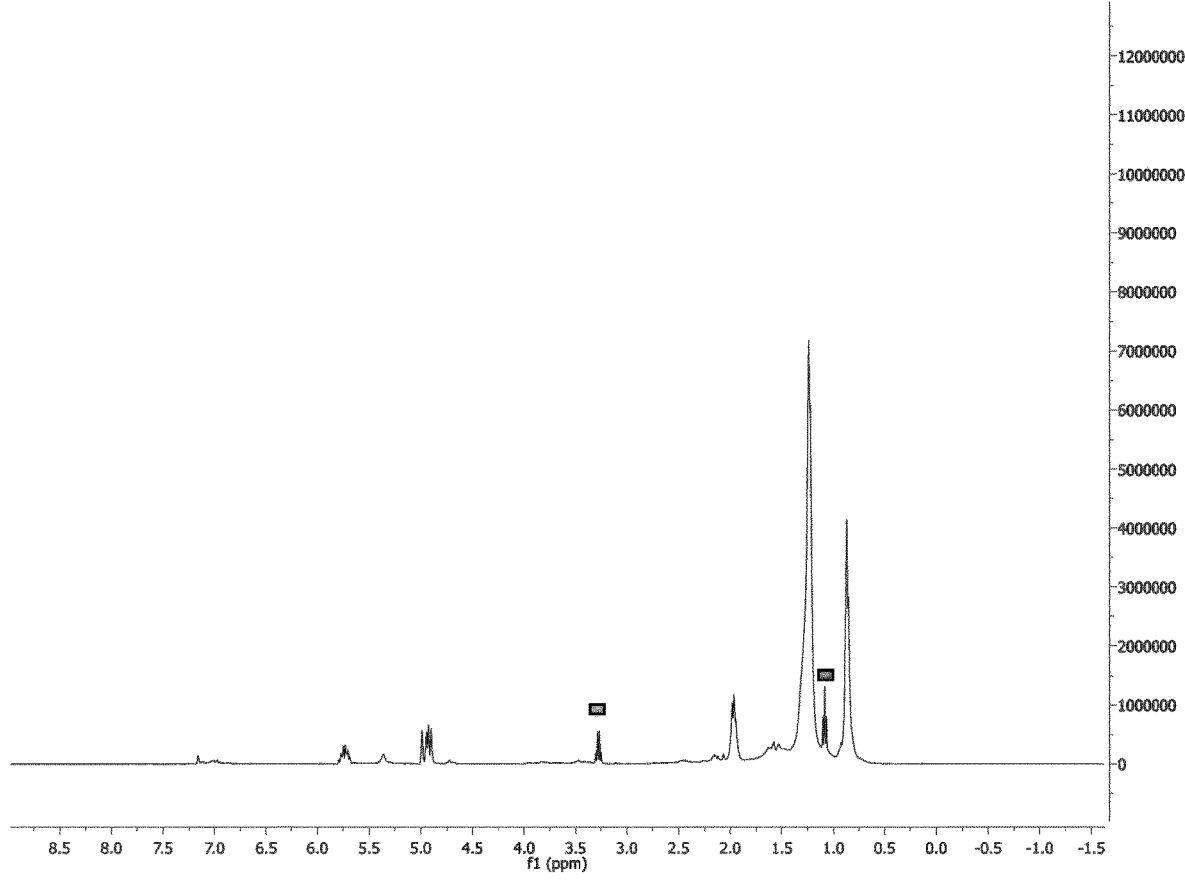
FIG. 10: $^1$H NMR spectrum of hydroformylated product of low-boiling pyrolysis oil feed fraction according to the invention. C6D6 was used as solvent. Grey rectangles indicate the residual diethyl ether from sodium borohydride workup.

Features and benefits of the present invention will become apparent from the following description, which includes examples intended to give a broad representation of the invention. Various modifications will be apparent to those skilled in the art from this description and from practice of the invention. The scope is not intended to be limited to the particular forms disclosed and the invention covers all modifications, equivalents, and alternatives falling within the scope of the invention as defined by the claims.

The term "plastic" as used herein generally refers to a polymeric material (mainly polyethylene, polypropylene or their copolymers) made in whole, or part, of at least one organic monomer, that may contain one or more modifications and/or may be compounded with one or more additives such as colorants, to form a useful material. Plastics include thermoset as well as thermoplastic polymeric materials. The term "waste plastic" refers to a post-consumer plastic that is no longer needed for its intended purpose. Examples of waste plastic include emptied plastic containers, discarded plastic wrapping, and the like.

The term "hydrocarbon" refers to an organic compound consisting entirely of hydrogen and carbon. Hydrocarbons include but are not limited to include paraffins, naphthenes, aromatics, and olefins.

The term "alkyl" refers to a hydrocarbyl group having no unsaturated carbon-carbon bonds. Optional heteroatom substitution or branching may be present in an alkyl group, unless otherwise specified herein.

The term "linear alpha olefin (LAO)" refers to an alkenic hydrocarbon bearing a carbon-carbon double bond at a terminal (end) carbon atom of the main carbon chain. Most often, no side chain branches are present in a LAO, although there may occasionally be a minor amount of branching component in a given LAO sample.

The terms "branch," "branched" and "branched hydrocarbon" refer to a hydrocarbon or hydrocarbyl group having a linear main carbon chain in which a hydrocarbyl side chain extends from the linear main carbon chain. The term "unbranched" refers to a straight-chain hydrocarbon or hydrocarbyl group without side chain groups extending therefrom.

Unless otherwise specified, the average branching number (average branching index) within a particular mixture of olefin oligomers equals (0×% linear olefins+1×% monobranched olefins+2×% dibranched olefins+3×% tribranched olefins)/100; wherein % linear olefins+% monobranched olefins+% dibranched olefins+% tribranched olefins=100%. The foregoing are weight percentages (wt. %). For example, a mixture of $C_8$ olefin oligomers comprising 10% linear $C_8$ olefins, 30% monobranched $C_8$ olefins, 50% dibranched $C_8$ olefins, and 10% tribranched $C_8$ olefins has an average branching index of 1.6. More highly branched individual olefin oligomers (e.g., tetrabranched and higher) may be weighted similarly to determine the average branching index.

The present application provides methods for producing higher alcohols from pyrolysis oil obtained by pyrolysis of waste plastic. The methods disclosed herein provide an alternative use for waste plastic, which may otherwise end up in landfills or in the environment.

Pyrolysis Oil from Waste Plastic

The pyrolysis of waste plastic is well known in the art, and may involve a catalytic or non-catalytic process, in a continuous or a batch process. Examples of companies practicing waste plastic pyrolysis include Agilyx Corporation, Recycling Technologies Ltd, Plastic Energy Ltd., and Licella. Non-limiting examples of such processes are described in patent applications WO2013/070801, WO2014/128430, and WO2011/123145, which are hereby incorporated by reference.

As mentioned above, the preparation of a pyrolysis oil from waste plastic is well known in the art. Accordingly, the preparation of the pyrolysis oil is not necessarily part of the methods described herein.

However, in certain embodiments, the preparation of a pyrolysis oil from waste plastic may be a part of the method. In such embodiments, the method comprises a step of preparing a pyrolysis oil from waste plastic. The preparation generally involves heating a container that has a waste plastic therein so as to effect depolymerization of the waste plastic, and obtaining a pyrolysis oil or condensed (liquid) pyrolysis product. In such embodiments, the method described herein may be an integrated process comprising said preparation of the pyrolysis oil, wherein the pyrolysis oil is used without intermediate storage or transportation steps.

An advantage of pyrolysis is that the process is not restricted to specific plastic types. Accordingly, the waste plastic may comprise a mixture of different types of plastic, and may still be used for preparing the pyrolysis oil, without requiring sorting. Preferred plastic types are those including high density polyethylene, low density polyethylene, and propylene and their polyolefin copolymers. However, also other plastic types may be present, such as polyethylene terephthalate (PET), polystyrene, and poly(vinyl chloride) (PVC).

Particularly polyolefins waste plastic is suited for pyrolysis and the pyrolysis oil obtained therefrom is suitable to be used as waste plastic feedstock in the production of higher alcohols. The waste plastic feedstock can be used as such, or blended with other higher olefins feedstock, such as conventional higher olefins feedstock obtained by oligomerization of olefins.

Depending on the origin and type of the waste plastic the pyrolysis oil obtained therefrom can be used as such or needs an additional clean-up to remove contaminants that may negatively impact the hydroformylation catalyst, the hydroformylation process and/or the hydroformylation product quality requirements.

The pyrolysis oil includes typically one or more hydrocarbon materials selected from paraffins, olefins, naphthenes, and aromatics. The relative amount of these components may depend on the specific pyrolysis process conditions and the waste plastic material. The boiling range of the pyrolysis oil may depend on factors such as the pyrolysis conditions and the plastic feed. Optionally, a waste plastic pyrolysis oil may be fractionated in order to obtain a pyrolysis oil having a certain boiling range and/or blended with a conventional higher olefins feed having a certain boiling range. The distillation points may be determined via gas chromatography according to ASTM D2887.

As used herein, conventional higher olefins are produced by oligomerization of any of propene, butenes, pentenes either as pure feed or as a mixture.

In the methods of the disclosure the conventional higher olefins feed to the hydroformylation reaction is replaced or blended with the waste plastic pyrolysis oil, such that the higher alcohols resulted from the hydroformylation reaction are either completely or partially made from waste plastic material.

Diolefin Hydrogenation

In embodiments of the disclosure, the waste plastic pyrolysis oil may contain diolefins which can impact the hydroformylation catalyst performance. Typically, diolefins concentration can range from 0.1 to 20 wt % based on the total olefin content.

Unless specified otherwise, the content of olefins, paraffins (n-paraffins and isoparaffins), naphthenes, and aromatics, may be determined using gas chromatography with vacuum ultraviolet absorption spectroscopy detection according to ASTM D8071.

Depending on the impurities present in the pyrolysis oil, one or more feed clean-up steps as described in the section "Contaminants Removal" may be performed before Diolefin Hydrogenation to protect the hydrogenation catalyst against deactivation.

A selective, low severity diolefins hydrogenation (DIOS) can be performed to remove such diolefins. The hydrotreatment can be performed on the pyrolysis oil before or after blending it with the conventional feedstream.

The hydrotreatment step can be performed in a hydrotreatment unit as known in the art. Hydrotreatment is generally done in the presence of a catalyst, under conditions suitable for the desired hydrogenation, as known by the skilled person. Suitable catalysts and process conditions are known in the art. Examples of suitable catalysts include catalysts based on nickel, cobalt, and or molybdenum, such as Nickel (Ni), Nickel-Molybdenum (NiMo), and Cobalt-Molybdenum (CoMo) catalysts, preferably provided on a solid support such as alumina.

Methods for the selective hydrogenation of diolefins are known in the art. U.S. Pat. No. 3,696,160, hereby incorporated by reference, discloses the selective hydrogenation of diolefins into their corresponding mono-olefins, using a sulfide nickel-tungsten catalyst. U.S. Pat. No. 6,118,034, hereby incorporated by reference, discloses the selective hydrogenation of diolefins at a temperature of 40° C. to 100° C., over a nickel-containing precipitated catalyst. U.S. Pat. No. 6,469,223, hereby incorporated by reference, discloses the selective hydrogenation of diolefins over a nickel-containing catalyst. Other catalysts and/or process conditions than those described in U.S. Pat. Nos. 3,696,160, 6,118,034, and 6,469,223 may be used as well.

In particular embodiments, the low severity diolefins hydrogenation operates at a high LHSV and low temperature (Table 1). The feed rate of hydrogen was set at three times or more than the expected stoichiometric consumption to manage heat release and catalyst deactivation. It was found that increasing the hydrogen feed rate may lead to a decrease in the olefin yield, due to a percentage of olefins that are saturated to paraffins. The hydrogen feed rate was chosen such that diolefin saturation has an acceptable impact on olefin yield. In a particular example, between about 5 to about 13% olefins are saturated to paraffins for between about 60 to about 99% diolefin saturation in the DIOS reactor. The hydrogenation reactor has a diameter to height ratio of less than one to capture pyrolysis oil particulates without appreciable pressure drop build-up. Optionally, the DIOS treatment can use one or more of the following strategies to mitigate significant pressure drop: bypass tubes, modified scale baskets and bypass reactor.

TABLE 1

| Diolefin Hydrogenation Operating Conditions and DIOS Reactor Settings | |
| --- | --- |
| Reactor | Diolefin Saturation Guard Reactor |
| Upstream Pretreatment: Oxygen Stripping | Optional |
| Catalyst | NiMo + Inert/Low Activity Granding Layer |
| Reactor Diameter to Height Ratio | <1 |
| Bypass Tubes/Modified Scale Baskets/ Bypass Bed | Yes |
| Average Reactor Temperature (° F.) | 275 430 |
| Heat Release, BTU/SCF H2 Consumed | ~150 |
| $H_2$ Treat Gas Rate Relative to Stoichiometric $H_2$ Consumption, scf/bbl/scf/bbl | >3× |
| LHSV, $hr^{-1}$ | 3-6 |
| Pressure, psig | 310-370 |

Contaminants Removal

Waste plastic pyrolysis oil contains various contaminants such as metals and heteroatom compounds. The term "heteroatom compounds" as used herein refers to molecules that include atomic species other than carbon and hydrogen. Examples of heteroatom compounds include compounds containing nitrogen, phosphor, oxygen, or halogens (such as chlorine and bromine). Such contamination can have a negative impact on the DIOS hydrogenation catalyst and/or on the subsequent hydroformylation process and equipment. Moreover, the contaminants are also undesired in the higher alcohols obtained therefrom. The processes described herein not only allow for use of the waste plastic pyrolysis oil as feed in the hydroformylation process, but also allow for obtaining high-purity alcohols.

The waste plastic subjected to pyrolysis may comprise polyethylene terephthalate (PET), high density polyethylene (HDPE), low density polyethylene (LDPE), polypropylene (PP) and various combinations thereof. The type and the concentration of contaminants varies upon the source of plastic waste. For example, waste plastic pyrolysis oil produced from HDPE, LDPE and PP tend to have lower sulfur, oxygen and nitrogen content, while waste plastic pyrolysis oil produced from PET tend to have higher aromatic content. Other plastics, such as the polyvinylchloride (PVC), may also be present in the waste plastic and their presence would require additional treatments to remove the chlorine. Plastic waste may contain other materials, such as polyacrylonitrile, polyacrylic acid, polyvinyl sulfonate, which can introduce also undesirable impurities (e.g., nitrogen, oxygen, sulfur). Contaminants can originate from multiple sources, including remnants from additives added to the plastic to improve its properties, dirt accumulating on the plastic during handling (use, collection, recycling), or unwanted polymers present in the waste plastic.

In the present methods, a broad-spectrum clean-up procedures able to remove or reduce to an acceptable level substantially all contaminants present in the waste plastic pyrolysis oil is applied. By applying the clean-up procedures, the contamination of one or more of the DIOS hydrogenation catalyst, the hydroformylation catalyst and the hydroformylation product is reduced or avoided. One or more clean-up steps of the waste plastic pyrolysis oil can be performed before introducing the feedstock into the DIOS hydrogenation reactor. Alternatively or additionally, one or more clean-up steps are applied after the DIOS hydrogenation and before the hydroformylation process.

The overall flow scheme for contaminants removal (as shown in FIG. 1) includes essentially two steps: i) a water wash wherein the pyrolysis oil feed (4) is contacted with water (3) in an extraction column/wash tower (5) to remove all water-soluble contaminants, and ii) a series of adsorbents (2), also referred to as a battery of adsorbents, which can be composed of adsorbents with general functionality, such as non-selective adsorbents and/or adsorbents with a specific functionality used to remove a specific contaminant.

Further, the hydrocarbon-rich fraction may be transferred to a settler (6—optional) to remove residual water, and can be purified further via a battery of adsorbents. The battery of adsorbents is composed of adsorbents with general functionality, such as non-selective adsorbents and/or adsorbents with a specific functionality used to remove a specific contaminant from the pyrolysis oil.

Each water-washing step is a liquid-liquid extraction process wherein the pyrolysis oil is contacted with an aqueous solution in order to extract water-soluble impurities from the pyrolysis oil. The water washing may be done using an extraction column or water wash tower known in the art. Examples of water wash towers or columns are described in patent applications EP2338864 and WO93/13040, which are hereby incorporated by reference. Non-limiting examples of suitable commercially available liquid-liquid extraction columns include KARR® columns and SCHEIBEL® columns, available from Koch Modular.

The water washing generally results in an aqueous phase (bottom stream) containing water-soluble components extracted from the pyrolysis oil, and an organic fraction (overhead stream) containing the hydrocarbon portion of the pyrolysis oil. The aqueous phase may be recirculated to be contacted with further pyrolysis oil.

The aqueous solution generally comprises at least 50 wt % water, preferably at least 75 wt %, more preferably at least 95 wt %. In particular embodiments, the aqueous solution has an initial pH (i.e. prior to contacting with the pyrolysis oil) ranging between 6 and 8, preferably about 6.5 and 7.5, more preferably about 7. The aqueous solution may be buffered to maintain a pH in such range.

In preferred embodiments, the relative volume of the pyrolysis oil feed to the volume of aqueous solution used in the one or more washing steps ranges from 1:1 to 1:200.

Additionally or alternatively, the pyrolysis oil is contacted with one or more adsorbents which are suitable for removing one or more contaminants such as (but not limited to): water, metals, chlorides, nitrogen-containing compounds, oxygenates, and phosphorous-containing compounds. More particularly, the pyrolysis oil feed may pass over one or more adsorbent beds, each containing one or more adsorbents. Each bed can have different adsorbents, or multiple beds can have the same adsorbent, depending on the adsorption capacity and the detected or expected contaminant level. Depending on the specific contaminants present or expected to be present in the pyrolysis oil feed, one or more adsorbents may be bypassed to avoid unnecessary purification steps. In particular embodiments, information regarding the contaminant level in the feed may be obtained via in-line monitoring and analysis.

The methods described herein are not limited to specific adsorbents. Various adsorbents suitable for removing one or more contaminants are known in the art and are commercially available. Examples of suitable multi-purpose adsorbents include Zeolite 13X adsorbents, activated carbon, alumina, and clays. Non-limiting examples of suitable adsorbents for removing selected contaminants are provided below:

Water: silica gel adsorbents (e.g. Sylobead® silica gels available from W. R. Grace) and molecular sieves (e.g. AZ-300, GB-620, Molsiv® ADG-401, and Molsiv® HPG-250 adsorbent available from UOP; and F-200 and 4A molecular sieves available from BASF).

Nitrogen compounds: Axsorb® 911 adsorbent available from Axens.

Mercury: AxTrap™ 273 adsorbent available from Axens, Durasorb™ HG available from BASF, and Mersorb® available from Selective Adsorption Associates Inc.

Chlorides: AxTrap™ 867 adsorbent available from Axens; UOP CLR-204, UOP CLR-300, and UOP CLR-454 available from UOP; Puraspec™ Clear™ chloride guards available from Johnson Matthey; HTG-10 available from Haldor Topsoe; and BASF CL-850.

Silicon: ACT 971 and ACT 981 available from Axens.

Oxygenates: Axsorb® 911 adsorbent available from Axens; UOP AZ-300, UOP GB-620, Molsiv® ADG-401, and Molsiv® HPG-250 available from UOP.

Sulfur: Axsorb® 913 adsorbent available from Axens; UOP ADS-120, UOP ADS-130, UOP ADS-280, and UOP SG-731 available from UOP; D-1275E, D1280E, and Prosorb® N available from BASF.

Phosphorus: TK-31 and TK-455 MultiTrap™ catalyst available from Haldor Topsoe.

In particular embodiments of the disclosure, the entire pyrolysis oil feed may be subjected to the washing step and/or contacting with adsorbents. In other embodiments, only a fraction (or a portion) of the pyrolysis oil feed may be subjected to such purification. In particular embodiments, the pyrolysis oil feed may be distilled as to obtain fractions having a different boiling range. The process may then continue with one or more fractions of interest. In other embodiments, the pyrolysis oil feed may be divided in fractions having the same composition, wherein some fractions may be purified and others not. The fractions may be rejoined after the purification of one or more of the fractions. By setting the relative volume of the purified and non-purified fractions, a targeted level of purification can be reached.

Hydroformylation

As used herein, hydroformylation, also referred to as the oxo process, represents the conversion of an olefin into an aldehyde through metal-catalyzed carbonyl addition. Hydroformylation reactions may take place by contacting synthesis gas ("syngas"), a mixture of carbon monoxide (CO) and hydrogen ($H_2$), with an olefin in the presence of a suitable catalyst to form a hydroformylation reaction product. Frequently, the aldehydes within the hydroformylation reaction product are converted into alcohols through subsequent reduction, thereby forming primary alcohols having one carbon atom more than the olefin from which they were produced. Long-chain primary alcohols formed through hydroformylation and subsequent reduction may find many uses including, for example, organic solvents, detergents, surfactants, or the alcohol component of ester-based plasticizers for polymers (e.g., PVC).

Typical hydroformylation catalysts comprise a Group 9 transition metal, such as cobalt or rhodium. Examples of suitable hydroformylation catalysts comprising cobalt include cobalt carbonyls, such as $Co_2(CO)_8$, which may convert to hydridocobalt tetracarbonyl $HCo(CO)_4$ under high $CO/H_2$ pressures commonly encountered during hydroformylation. Suitable syngas pressures effective for forming $HCo(CO)_4$ in situ may range from about 1 MPa to about 30 MPa, with a ratio of $H_2$:CO partial pressures ranging from about 2:3 to about 3:2, preferably about 1.2:1. Suitable reaction temperatures during hydroformylation may range from about room temperature to about 200° C. (i.e., about 25° C. to about 200° C.), or any subrange in between.

In embodiments of the disclosure higher alcohols are produced with a high pressure cobalt catalyzed oxo process. The cobalt is fed together with the olefin feed and syngas to the Oxo reactors at a pressure of about 280-300 bar and a temperature of about 160-200° C. At these conditions the olefins are hydroformylated to aldehydes and some by-products such as acetals and dimers. The hydroformylation product is hydrogenated over a copper chromite, sulfided NiMo or sulfided CoMo catalyst. Typical process conditions include a temperature range between 80-200° C. and a pressure of 60 to 150 bar. After hydrogenation the product is distilled to remove any unreacted olefins, paraffins, aromatics and naphthenics (if present), and to recover the alcohol fraction. After distillation a final mild hydrogenation may be required to remove traces of aldehydes. Depending on the boiling point range of the olefins present in the hydroformylation feed, a range of higher alcohols products is obtained.

Alternatively the hydroformylation reaction is run on a low pressure Rh-catalyst process employing process conditions known in the art. Examples of Rh-catalyst hydroformylation process are described for example in patent number EP 1004563 B1 and in patent application publication number WO 2017/080690 A1.

The methods of the invention describe producing higher alcohol from a hydrocarbon stream consisting essentially of pyrolysis oil feed obtained from plastic waste or from a blend of a waste plastic pyrolysis oil feed with a conventional feed. In embodiments of the invention, the pyrolysis oil feed comprises at least 20 wt % higher olefins with a carbon number in the range C5-C20, based on its total hydrocarbon content. Advantageously, by providing a pyrolysis oil feed that comprises at least 20 wt % higher olefins one can avoid dilution with large amounts of non-reactive molecules which would require more reactor and distillation capacity to produce and recover alcohols.

In embodiments of the invention, the pyrolysis oil obtained from waste plastic contains an increased level of linear alpha olefins, as compared to the conventional petroleum-based feedstock. The pyrolysis oil contained at least 10 wt % linear alpha olefins, in further embodiments at least 50 wt % linear alpha olefins based on their total olefin content. In embodiments of the invention, the olefins comprised in the pyrolysis oil are characterized by an average branching number per molecule lower than 1, preferably lower than 0.8. Olefin oligomers having an average branching number of about 2.2 or less may exhibit advantageous biodegradation properties. Advantageously, the higher alcohols produced therefrom are characterized by also by a low average branching number, such as an average branching number per molecule lower than 2, which may confer an improved biodegradability to the derivatives produced from such alcohols.

In embodiments of the invention, the hydrocarbon feed stream consist essentially of the pyrolysis oil.

In further embodiments of the invention the hydrocarbon feed stream comprises further a conventional feed stream. Blending a conventional higher olefin feed with the pyrolysis oil allows tailoring the average branching number per molecule of the hydrocarbon feed.

In yet other embodiments using relatively low concentrations of pyrolysis oil (for example as low as about 1 wt % or even lower) allows for lowering the concentration of certain contaminants in the hydrocarbon feed via dilution, thereby reducing the adverse effects of such contaminants on other process steps such hydroformylation. When using very low pyrolysis oil concentrations in the hydrocarbon feed stream, in particular concentrations below 1 wt %, the contaminants may be diluted to such extent, that no further treatments of the hydrocarbon feed stream are necessary.

By using a waste plastic pyrolysis feedstock source alone or by blending the waste plastic pyrolysis feedstock source with a conventional petroleum-based feedstock, the throughput of the oxo alcohol plant can be increased, thereby improving the efficiency of the process.

To facilitate a better understanding of the present disclosure, the following examples of preferred or representative embodiments are given. In no way should the following examples be read to limit, or to define, the scope of the invention.

Experimental Procedures

Standard air-sensitive technique and purification methods were utilized for these tests. Commercially sourced materials were utilized as received or purified according to standard procedures (Anarego, W. L.; Chair, C. L. Purification of Laboratory Chemicals; 5 ed.; Elsevier: Oxford, 2003).

The $Co_2(CO)_8$ pre-catalyst was purchased from Strem Chemicals (Newburyport, MA) and stored at −35° C. prior to use. Unless otherwise noted, manipulations were conducted at ambient temperature (22-28° C.).

To characterize the pyrolysis oil compositions and the alcohol compositions of the present invention, gas chromatographic (GC) and nuclear magnetic resonance (NMR) methods were employed. Two NMR methods were employed to characterize the branching in the alcohol samples: $^1$H NMR to determine the average number of branches per molecule and $^{13}$C NMR to determine the branch site distribution, GC-MS data were obtained on an Agilent 5977 Series GC/MSD system. Data analysis was performed using vendor provided MassHunter GC/MS acquisition software in conjunction with MSD ChemStation and the NIST Mass Spectra Search Program (v2.2; June 2014). Further analyses were carried out with OrinPro2019 and Microsoft Excel.

$^1$H and $^{13}$C NMR spectroscopic data were collected on a 400 MHz Bruker NEO NMR spectrometer. $^1$H and $^{13}$C{1H} chemical shifts are reported in ppm relative to SiMe4 ($^1$H and $^{13}$C{1H} δ=0.0 ppm) using the known chemical shift of residual proton or carbon resonances, respectively, corresponding to deuterated solvents (i.e., $C_6D_6$, $CDCl_3$ etc.) as reported in J. Am. Chem. Soc., (2010), v. 29, pp. 2176-2179.

Pyrolysis Oil Feed Characterization

The pyrolysis oil feed was derived from polyethylene plastic subjected to pyrolysis and distillation to afford broad distillate cuts. The waste plastic pyrolysis oil feed was clear with a very pale yellow color. The pyrolysis oil feed was characterized by GC-MS (FIG. 2-5) and NMR spectroscopy (FIGS. 6-9).

Major components of the mixtures are outlined in Table 2 (low-boiling cut) and Table 3 (high-boiling cut). Total linear alpha olefin content measured for the low-boiling cut was about 73 wt %. Total linear alpha olefin content measured for the high-boiling cut was about 64 wt %. Consistent with GC-MS results, NMR spectroscopy ($^1$H and $^{13}$C{1H}) confirmed that the feeds were predominantly (i.e. more than 50 wt %) comprised of vinyl-terminated olefins.

As shown in FIGS. 6-9, NMR data indicate the presence of a substantial number of trace components including but not limited to aromatics and dienes.

In the low-boiling cut (93-177° C.) toluene and trace xylenes were identified. The $^{13}$C NMR spectroscopic shifts centered at 39.55 ppm (FIG. 7) in conjunction with $^1$H NMR spectroscopic shifts centered between 6.61-6.08 ppm (FIG. 6) are consistent with the presence of non-conjugated ("step-dienes"), such as 1,4-hexadiene. The presence of these species is a potential concern as they are easily isomerized under hydroformylation conditions to afford conjugated dienes that are known catalyst poisons.

TABLE 2

Major Components Identified by GC-MS for low-boiling cut:

| Low-Boiling Cut 93° C.-177° C. | Area % |
| --- | --- |
| Total LAO Content | 73.24 |
| 1-hexene | 2.51% |

TABLE 2-continued

Major Components Identified by GC-MS for low-boiling cut:

| Low-Boiling Cut 93° C.-177° C. | Area % |
| --- | --- |
| 1-heptene | 6.93% |
| 1-octene | 12.89% |
| 1-nonene | 16.09% |
| 1-decene | 21.13% |
| 1-undecene | 7.77% |
| 1-dodecene | 3.74% |
| 1-tridecene | 2.17% |
| Other Components | 26.76 |
| toluene | 5.29% |
| octane | 4.16% |
| 2,4-dimethyl-1-heptene | 3.21% |
| 1,8-nonadiene | 3.22% |
| nonane | 4.05% |
| 1,9-decadiene | 3.40% |
| decane | 3.44% |

TABLE 3

Major Components Identified by GC-MS for high-boiling cut:

| High Boiling Cut 177° C.-232° C. | Area % |
| --- | --- |
| Total LAO Content | 63.78 |
| 1-nonene | 1.02% |
| 1-decene | 9.54% |
| 1-undecene | 16.53% |
| 1-dodecene | 14.16% |
| 1-tridecene | 11.52% |
| 1-tetradecene | 8.44% |
| 1-pentadecene | 2.56% |
| Other Components | 36.22% |
| 1,9-decadiene | 1.42% |
| decane | 2.08% |
| 1,10-undecadiene | 3.82% |
| undecane | 4.10% |
| 1,11-dodecadiene | 4.89% |
| dodecane | 4.43% |
| 1,12-tridecadiene | 5.09% |
| tridecane | 3.18% |
| 1,13-tetradecadiene | 3.54% |
| tetradecane | 2.31% |
| 1,14-pentadecadiene | 2.56% |

Pyrolysis Oil Feed Hydroformylation

A high-pressure, 316 SS, continuously-stirred, constant pressure batch autoclave reactor (600 mL) equipped with supervisory control and data acquisition capabilities was utilized for waste plastic pyrolysis oil feed hydroformylation.

The interior of the reactor was fitted with a glass liner. In a nitrogen filled glovebox, solvent, the plastic waste feed and pre-catalyst were introduced into the reactor in the volumes and quantities specified in Table 4. The reactor was then sealed under nitrogen (3 psig $N_2$), removed from glovebox and connected to a reactor system with supervisory control, heating, stirring, cooling and process gas-supply. The reactor system was then pressurized to 1500 psig ($H_2$/CO) at room-temperature (23° C.) and then heated to 150° C. The reactor reached process temperature in about 20 min. Once at process temperature, the batch autoclave was operated in constant pressure mode for 4 h. At the end of the run, the process gas supply (syngas) was halted and the unit de-pressurized and purged with nitrogen. Once cool, the reactor was opened and the liquid hydrocarbon product was filtered through a column of activated, basic alumina to remove catalyst ash.

TABLE 4

Hydroformylation Conditions:

| Entry | 1 | 2 |
|---|---|---|
| Experiment # | Low Boiling Cut | High Boiling Cut |
| Pre-Catalyst | $CO_2(CO)_8$ | $CO_2(CO)_8$ |
| Pre-Catalyst MW | 341.95 | 341.95 |
| Catalyst Concentration in reactor (mM) | 20.00 | 20.00 |
| Catalyst Concentration in reactor (PPM; mg[Co]/Kg Olefin) | 1597.37 | 1561.06 |
| Pre-catalyst quantity (mmol) | 0.900 | 0.900 |
| Pre-catalyst mass (mg) | 307.755 | 307.755 |
| Syngas (1:1) Pressure | 1500 | 1500 |
| Run Temperature ° C. | 150 | 150 |
| Run Time (h) | 4 | 4 |
| Feed mass (g) | 66.41 | 67.95 |
| Feed volume (mL) | 90.00 | 90.00 |
| Feed Density (g/mL) | 0.74 | 0.76 |
| Solvent | None | None |
| Total liquid volume (mL) | 90 | 90 |

$NaBH_4$ Finishing

The crude alcohol from each hydroformylation reaction was transferred into a round-bottom flask (500 mL) equipped with PTFE-coated magnetic stir bar. Under a nitrogen atmosphere, a slight excess of $NaBH_4$ (about 17.5 g) was added. The material was allowed to stir 16 hours. The resulting slurry was then combined with pentane (100 mL). Each reaction mixture was then transferred to a larger beaker (1 L) and water was slowly added over the course of 1 hour. The reaction mixture was then neutralized to a pH of about 6.5 by addition of 10% $HCl/H_2O$. Once effervesce ceased upon addition of HCl, each reaction mixture was subjected to an aqueous work-up, wherein Et2O (3×150 mL) was used to extract the product into an organic phase. The organic phases were combined, dried with $MgSO_4$ and filtered. The resulting colorless filtrates were concentrated under rotary evaporation to remove volatiles (principally pentane).

The crude alcohol product was analyzed by $^1$H and $^{13}$C{1H} NMR spectroscopy as shown in FIGS. 10-13. Yield and conversion estimates are shown in Table 5.

Figure 11:
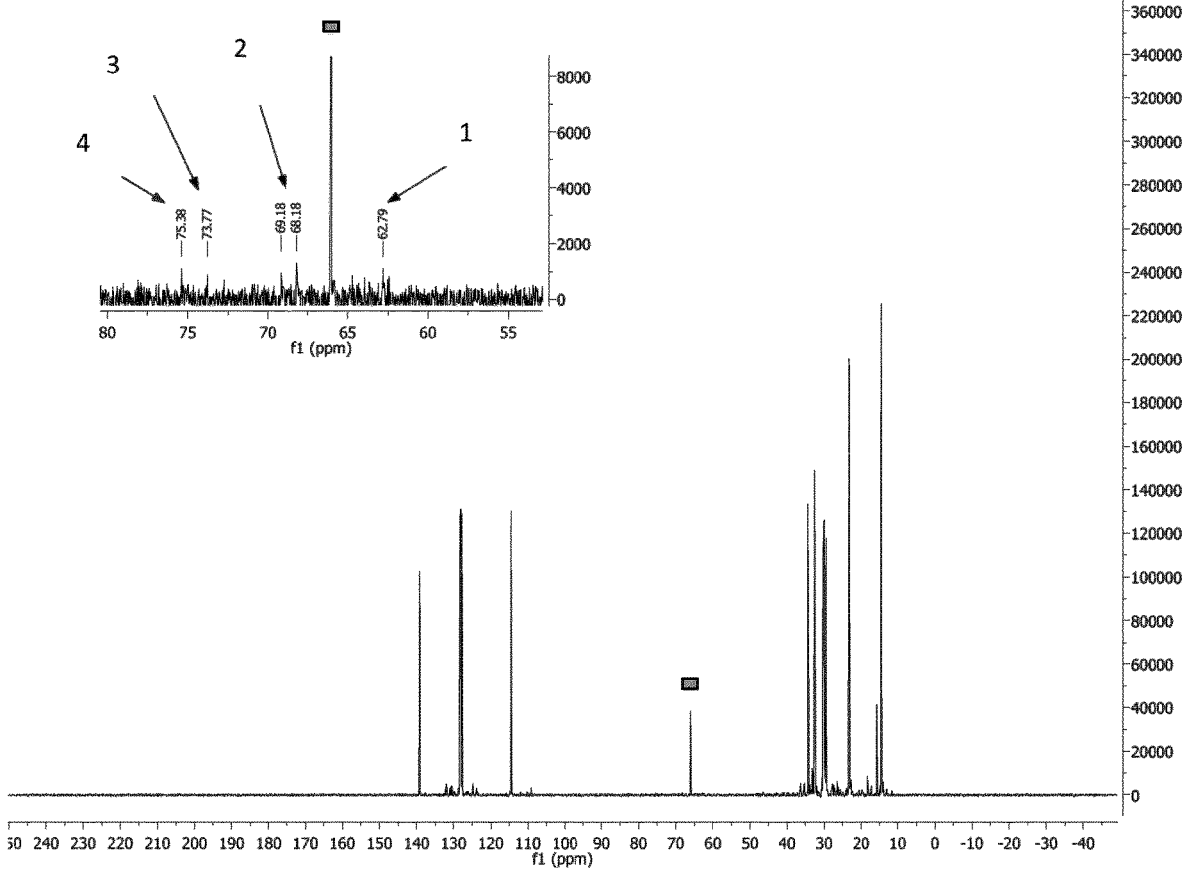
FIG. 11: $^{13}$C{1H} NMR spectrum of hydroformylated product of low-boiling pyrolysis oil feed fraction according to the invention. C6D6 was used as solvent. Grey rectangles indicate the residual diethyl ether from sodium borohydride workup. In the insert the range 55 to 80 ppm was expanded to show the peaks attributed to: (1) primary alcohol (—CH2-OH); (2) secondary methyl branched alcohol (—CH(CH3)-OH); (3) secondary alkyl branched alcohol (—CH(R)—OH); (4) tertiary alcohol (—C(R)(R*)—OH)
Figure 12:
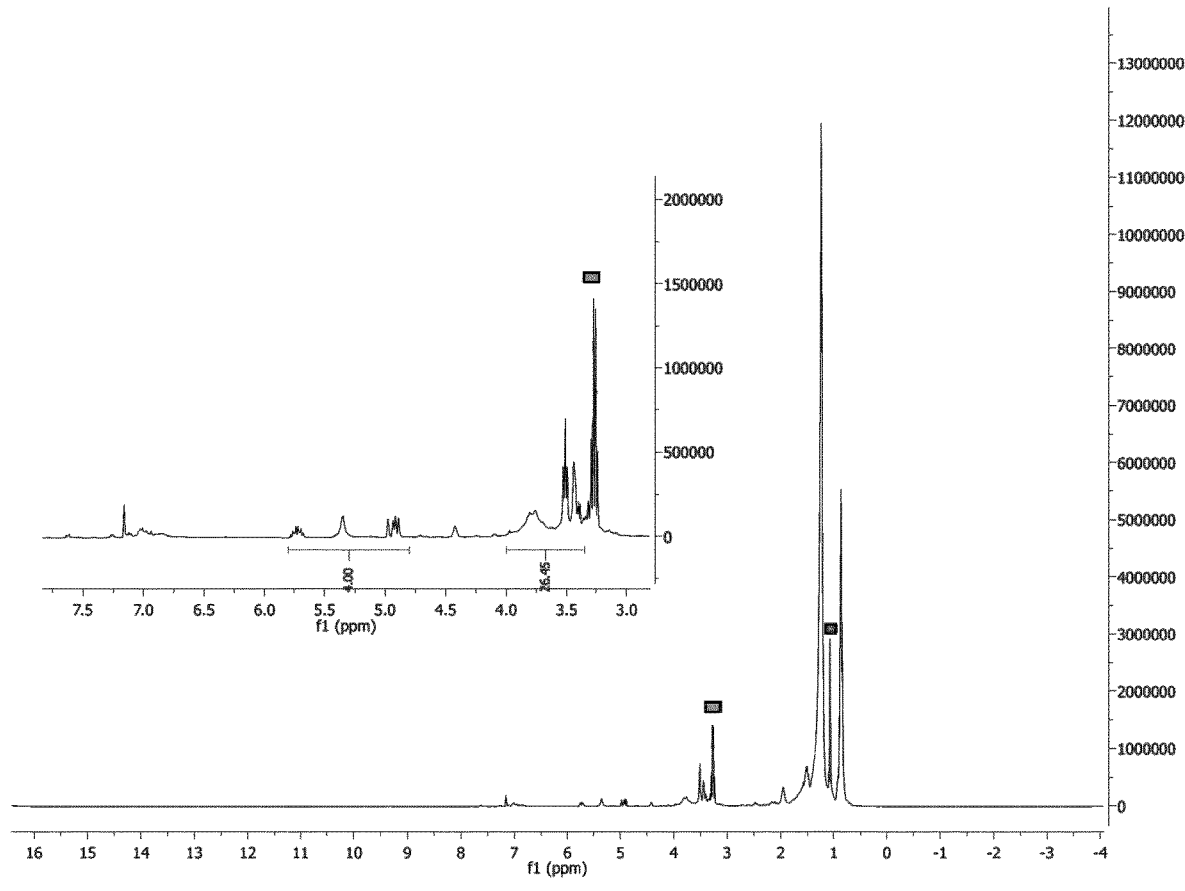
FIG. 12: $^1$H NMR spectrum of hydroformylated product of high-boiling pyrolysis oil feed fraction according to the invention. C6D6 was used as solvent. Grey rectangles indicate the residual diethyl ether from sodium borohydride workup. In the insert, the range 3.0 to 7.5 ppm was expanded.
Figure 13:
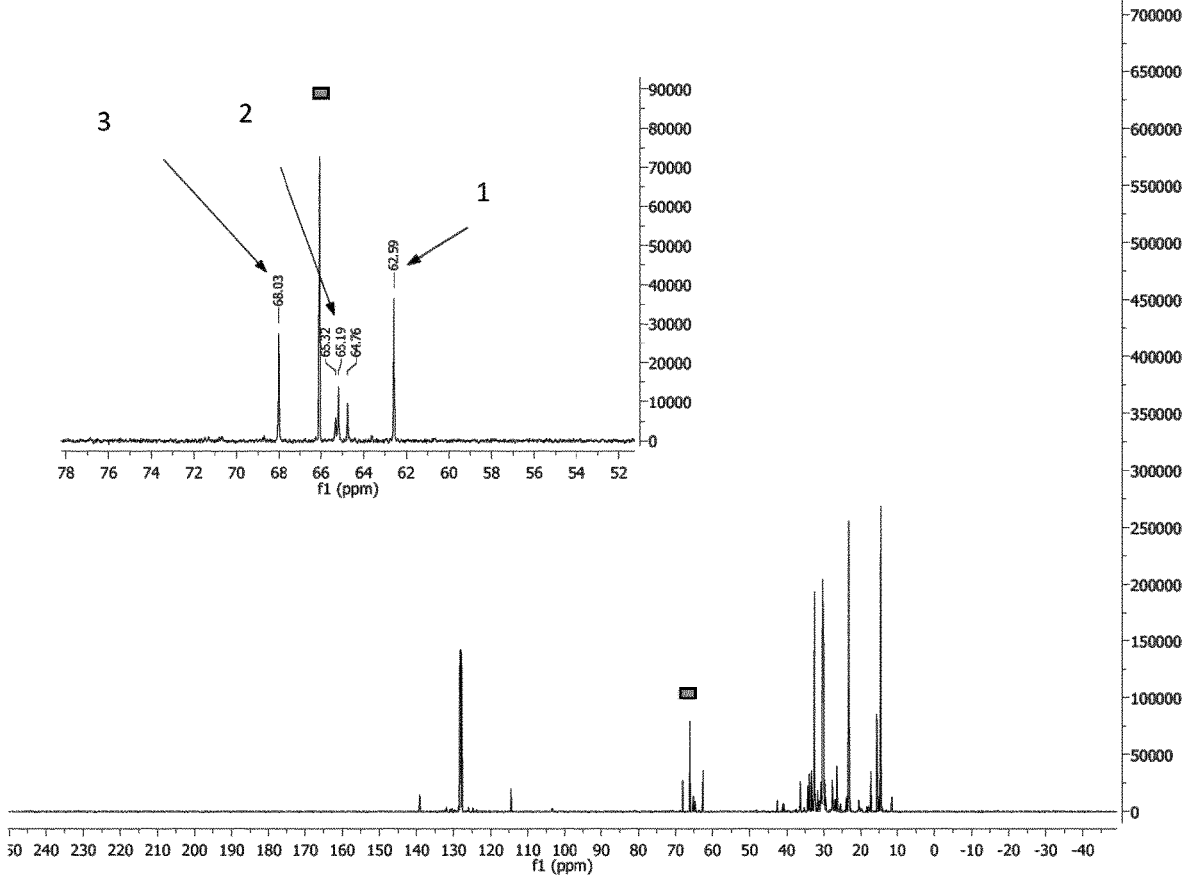
FIG. 13: $^{13}$C{1H} NMR spectrum of hydroformylated product of high-boiling pyrolysis oil feed fraction according to the invention. C6D6 was used as solvent. Grey rectangles indicate the residual diethyl ether from sodium borohydride workup. In the insert the range 52 to 78 ppm was expanded to show the peaks that correspond to: (1) primary alcohol (—CH2-OH); (2) secondary methyl branched alcohol (—CH(CH3)-OH); (3) secondary alkyl branched alcohol (—CH(R)—OH).

In both instances, $^1$H NMR spectroscopic signals consistent with alcohol formation were present. This was verified by $^{13}$C NMR spectroscopy where diagnostic chemical shifts, located between 62-75 ppm, were present and consistent with the formation of primary, secondary and tertiary alcohols. FIGS. 11 and 13 show in the insert the peaks that were assigned to: (1) primary alcohol (—CH2-OH); (2) secondary methyl branched alcohol (—CH(CH3)-OH); (3) secondary alkyl branched alcohol (—CH(R)—OH); (4) tertiary alcohol (—C(R)(R*)—OH).

TABLE 5

Alcohol Yield and Conversion

Isolated Product Yield

| | |
|---|---|
| Hydroformylated Low Boiling Cut: | 19.95 g crude liquid product; 30.4% |
| Hydroformylated High Boiling Cut: | 53.20 g crude liquid product; 78.3% |
| | Estimated Conversion |

TABLE 5-continued

Alcohol Yield and Conversion

| | |
|---|---|
| Hydroformylated Low Boiling Cut: | $(0.83/4.83)*100 = 17.2\%$ |
| Hydroformylated High Boiling Cut: | $(26.45/30.45)*100 = 86.9\%$ |

Conversion is expressed as the percent relative intensity of alcohol content vs. residual unsaturation content. The integration range for olefin unsaturation includes vinyl, vinylidene and internal unsaturations. The integration range for alcohols captures the intensity of protons located alpha to the —OH functional group.

Integrated range for olefinic unsaturation corresponds to 4.8-5.8 ppm (C6D6). Integrated range for estimated alcohol content corresponds to 3.35-4.0 ppm (C6D6).

The following formula was used for the Estimated Conversion (% Conversion) as a function of the Integrated Alcohol Intensity (IAI) and Integrated Unsaturated Intensity (IUI):

$$\% \; Conversion = \frac{(IAI)}{(IUI) + (IAI)} \times 100$$

Hydrogenation

Alternatively or in combination with sodium borohydride reduction, the hydroformylation product may be hydrogenated to convert residual olefin content to paraffinic materials. Typically, this is conducted by allowing the neat hydroformylation product or a solution thereof to contact a hydrogenation catalyst containing one or more of the following transition metals Pd, Pt, Co, Ni, or Mo in the presence of hydrogen gas. Preferably these reactions are conducted with a hydrogen pressure above 100 psig at a temperature higher than 50° C.

Distillation

The crude hydroformylation product or product mixture obtained from either or both hydrogenation and/or sodium borohydride reduction can be, optionally, distilled. The purpose of distillation is to separate product alcohols and other molecules in the product mixture(s) by boiling point. The distillation technique may proceed at atmospheric pressures or reduced pressures and may utilize low-resolution distillation techniques (i.e., short-path) or high-resolution distillation techniques (i.e., distillation towers, spinning-band columns etc.).

Additional Embodiments

This disclosure may further include one or more of the following non-limiting embodiments:

E1. A method for producing a higher alcohol from a waste plastic feedstock, comprising: (a) providing a hydrocarbon feed stream comprising a pyrolysis oil feed obtained from pyrolysis of plastic waste, wherein the pyrolysis oil comprises at least 20 wt % higher olefins with a carbon number in the range C5-C20, based on its total hydrocarbon content; (b) contacting the hydrocarbon feed stream with synthesis gas under hydroformylation conditions in the presence of a hydroformylation catalyst and recovering a hydroformylation product; (c) subjecting the hydroformylation product to hydrogenation and/or a distillation to recover a higher alcohol product.

E2. The method of embodiment E1, wherein the hydrocarbon feed stream consists essentially of pyrolysis oil obtained from pyrolysis of plastic waste.

E3. The method of embodiment E1, wherein the hydrocarbon feed stream further comprises a higher olefins conventional feed.

E4. The method of embodiment E3, wherein the higher olefins conventional feed is a petroleum-based higher olefins feed, such as a higher olefins feed obtained by oligomerization of C3=, C4=, C5= olefins.

E5. The method of any one of embodiments E1-E4, wherein the pyrolysis oil feed comprise at least 50 wt % linear alpha-olefins, more preferably at least 60 wt % linear alpha-olefins, based on its total olefin content.

E6. The method of embodiment E5, wherein the pyrolysis oil feed is characterized by an average number of branches per molecule that is less than 1, preferably less than or equal to 0.8.

E7. The method of any one of embodiments E1-E6, further comprising: prior to step (b), subjecting the pyrolysis oil feed to a distillation thereby separating one or more of fractions corresponding to any narrow cut range within the range C7-C20, in particular to the carbon number ranges C7-C19, C7-C10, C7-C12, C10-C13, C13-C17, C13-C15 and C16-C19.

E8. The method of any one of embodiments E1-E7, further comprising: prior to step (b), subjecting at least a portion of the hydrocarbon feed stream, preferably the pyrolysis oil feed, to a selective reduction of diolefins in the presence of a nickel-containing catalyst.

E9. The method of any one of embodiments E1-E8, further comprising: prior to step (b), contacting at least a portion of the hydrocarbon feed stream, preferably the pyrolysis oil feed, with a water solution to thereby at least partially remove water-soluble contaminants.

E10. The method of any one of embodiments E1-E9, further comprising: prior to step (b), contacting at least a portion of the hydrocarbon feed stream, preferably the pyrolysis oil feed, with one or more adsorbents suitable to thereby at least partially remove one or more contaminants selected from: water, metals, chlorides, nitrogen-containing compounds, oxygenates, and phosphorous-containing compounds.

E11. A higher alcohol obtainable by the method of any one of embodiments E1-E10.

E12. A composition comprising one or more derivatives of the higher alcohol of embodiment E11.

E13. The composition of embodiment E12, wherein the derivative comprises esters of monocarboxylic acids, esters of dicarboxylic acids, esters of polycarboxylic acids, alkoxylated alcohols, sulfated alcohols, sulfated alkoxylated alcohols and alcohol ether amines.

E14. The composition of embodiment E12, wherein the derivative comprises esters of the primary alcohol composition with one or more acids.

E15. The composition of embodiment E14, wherein the acids comprise one or more of phthalic acid, adipic acid, sebacic acid, lauric acid, myristic acid, palmitic acid, stearic acid, oleic acid, succinic acid and trimellitic acid.

The disclosure herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. All numerical values within the detailed description and the claims herein are modified by "about" or "approximately" with respect to the indicated value, and take into account experimental error and variations that would be expected by a person having ordinary skill in the art. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present invention.

The invention claimed is:

1. A method for producing a higher alcohol from a waste plastic feedstock, comprising:

(a) providing a hydrocarbon feed stream comprising a pyrolysis oil feed obtained from pyrolysis of plastic waste, wherein the pyrolysis oil feed comprises at least 20 wt % higher olefins with a carbon number in the range C5-C20, based on its total hydrocarbon content;

(b) contacting the hydrocarbon feed stream with synthesis gas under hydroformylation conditions in the presence of a hydroformylation catalyst and recovering a hydroformylation product;

(c) subjecting the hydroformylation product to hydrogenation and/or a distillation to recover a higher alcohol product; and the method further comprises prior to step (b) one or more of:

subjecting at least a portion of the hydrocarbon feed stream to a selective reduction of diolefins in the presence of a nickel-containing catalyst;

contacting at least a portion of the hydrocarbon feed stream with a water solution to thereby at least partially remove water-soluble contaminants; and contacting at least a portion of the hydrocarbon feed stream with one or more adsorbents suitable to thereby at least partially remove one or more contaminants selected from: water, metals, chlorides, nitrogen-containing compounds, oxygenates, and phosphorous-containing compounds.

2. The method of claim 1, wherein the hydrocarbon feed stream consists essentially of pyrolysis oil obtained from pyrolysis of plastic waste.

3. The method of claim 1, wherein the hydrocarbon feed stream further comprises a higher olefins conventional feed, wherein the higher olefins conventional feed is a petroleum-based higher olefins feed.

4. The method of claim 3, wherein the petroleum-based higher olefines feed is a higher olefin feed obtained by oligomerization of C3=, C4=, C5= olefins.

5. The method of claim 1, wherein the pyrolysis oil feed comprise at least 50 wt % linear alpha-olefins, based on its total olefin content.

6. The method of claim 5, wherein the pyrolysis oil feed is characterized by an average number of branches per molecule that is less than 1.

7. The method of claim 1, further comprising:

prior to step (b), subjecting the pyrolysis oil feed to a distillation thereby separating one or more fractions corresponding to any narrow cut range within the range C7-C20.

8. The method of claim 1, wherein the pyrolysis oil feed comprise at least 60 wt % linear alpha-olefins, based on its total olefin content.

9. The method of claim 5, wherein the pyrolysis oil feed is characterized by an average number of branches per molecule that is less than or equal to 0.8.

* * * * *